United States Patent
Alinikula et al.

(10) Patent No.: US 6,944,457 B2
(45) Date of Patent: Sep. 13, 2005

(54) COMMUNICATION SYSTEM, A COMMUNICATION DEVICE AND A METHOD FOR PERFORMING COMMUNICATION

(75) Inventors: Petteri Alinikula, Helsinki (FI); Mauri Honkanen, Tampere (FI); Pertti Huuskonen, Oulu (FI); Antti Lappeteläinen, Espoo (FI); Jarno Leinonen, Lempäälä (FI); Arto Palin, Lempäälä (FI); Aarno Pärssinen, Espoo (FI); Visa Smolander, Espoo (FI); Jukka Reunamäki, Tampere (FI); Juha Salokannel, Kangasala (FI); Fujio Watanabe, San Jose, CA (US); Heikki Huomo, Espoo (FI)

(73) Assignee: Nokia Corporation, Espoo (FI)

( * ) Notice: Subject to any disclaimer, the term of this patent is extended or adjusted under 35 U.S.C. 154(b) by 452 days.

(21) Appl. No.: 10/093,896

(22) Filed: Mar. 8, 2002

(65) Prior Publication Data

US 2002/0193072 A1 Dec. 19, 2002

(30) Foreign Application Priority Data

Mar. 9, 2001 (FI) .............................. 20010484

(51) Int. Cl.⁷ ................................. H04Q 7/20
(52) U.S. Cl. ................ 455/450; 455/509; 455/511; 370/431; 370/432; 375/356
(58) Field of Search .............. 455/41.2, 41.3, 455/450, 509, 511, 512; 370/236, 229, 236.1, 236.2, 397, 431, 432, 436, 437; 375/220, 222, 356, 357, 358

(56) References Cited

U.S. PATENT DOCUMENTS

| | | | |
|---|---|---|---|
| 5,960,344 A | 9/1999 | Mahany | ................ 455/432 |
| 6,526,264 B2 * | 2/2003 | Sugar et al. | ............ 455/84 |
| 6,760,317 B1 * | 7/2004 | Honkanen et al. | ...... 370/329 |

FOREIGN PATENT DOCUMENTS

| | | | | |
|---|---|---|---|---|
| WO | WO 00/62449 | 10/2000 | | |
| WO | WO 01/06710 A1 | 1/2001 | | |
| WO | WO 01/11833 A1 * | 2/2001 | ........... | H04L/12/56 |
| WO | WO 01/15472 A1 | 3/2001 | | |

* cited by examiner

Primary Examiner—Vivian Chin
Assistant Examiner—Sanh Phu
(74) Attorney, Agent, or Firm—Perman & Green, LLP.

(57) ABSTRACT

The present invention relates to a communication system comprising devices (2a–2d) having means for short range communication using a certain frequency band. The frequency band is divided into communication channels. In the communication system some of said communication channels are predefined for establishment of the connection and other communication channels are predefined for data transfer between at least two devices. The present invention also relates to a communication device for communication in a communication system, the device having means for short range communication using a certain frequency band, which is divided into communication channels. The present invention further relates to a method for performing communication in a communication system comprising devices, which have means for short range communication using a certain frequency band, which is divided into communication channels.

15 Claims, 10 Drawing Sheets

Fig 3a

| Preamble 16...40 bits | Header + payload + CRC etc. (defined by MAC layer) |

Fig 3b

| Lower part of device's 64-bit IEEE address (40 bit) | S/I (1 bit) | Channel to be used for unicast traffic (7 bit) | CRC (16) |

Fig 3c

| Lower part of device's 64-bit IEEE address (40 bit) | Data Length ( ) | Upper layer packet (n bits) | CRC (16) |

Fig 3d

| Source Address | Destination Address | TYPE/SAR | ACK bit | Data Length | CRC (16) | Payload | CRC (32) |

Fig 3e

| Type of message | ConnectionTO value | AcknowledgeTO value | ARQ scheme | Amount of packets |

Fig 3f

| Type of message | ConnectionTO value | AcknowledgeTO value | ARQ scheme | Amount of packets |

Fig 3g

| Type of message | Reason code (optional) |

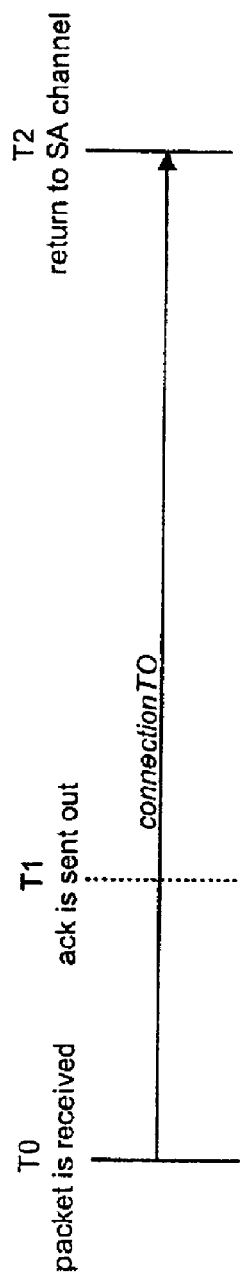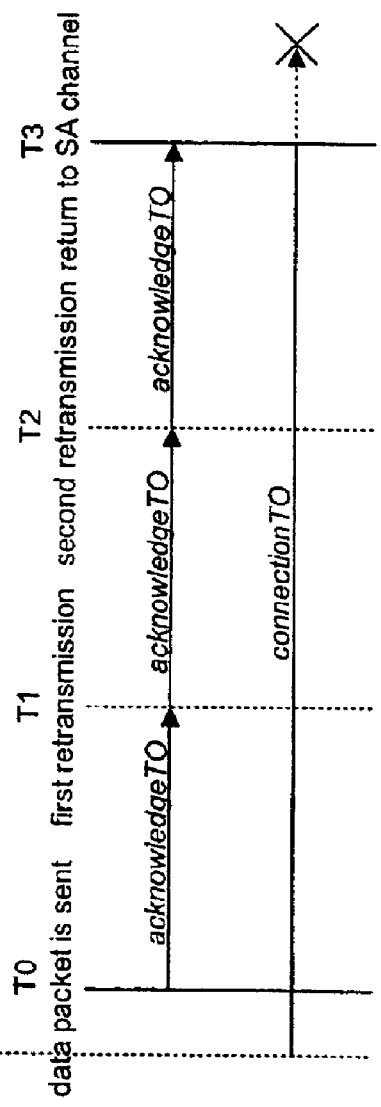
Fig 5a
Fig 5b

COMMUNICATION SYSTEM, A COMMUNICATION DEVICE AND A METHOD FOR PERFORMING COMMUNICATION

TECHNICAL FIELD OF THE INVENTION

The present invention relates to communication system, a communication device and a method for performing communication

BACKGROUND OF THE INVENTION

The present invention relates to a communication system comprising devices having means for short range communication using a certain frequency banc, which is divided into communication channels. The present invention relates to a communication device for communication in a communication system, the device having means for short range communication using a certain frequency band, which is divided into communication channels. The present invention further relates to a method for performing communication in a communication system comprising devices, which have means for short range communication using a certain frequency band, which is divided into communication channels.

Communication systems for short range communication have been developed. For example, WLAN-system (Wireless Local Area Network) is designed for enabling wireless communication between devices in a local network. This kind of wireless communication network eliminates the need for installing communication cables e.g. in an office or at home. Another wireless communication system for short range communication is Bluetooth™. It has been designed for enabling wireless communication between different kind of electronic devices, such as mobile terminals, for communication from a radio device to wireless headphones, etc. The above mentioned systems are using license free radio frequencies, such as 2.45 GHz frequency band, which is divided into a number of communication channels.

The systems of prior art has the disadvantage that the devices need quite complicated communication means, which increase the power consumption, size and production costs of the devices. Further, if there are many devices which uses the same frequency band in a small area, the devices may disturb each other and communication may be unsuccessful.

SUMMARY OF THE INVENTION

It is an objective of the present invention to provide a communication system, in which short range communication between communication devices is possible with simpler structures and smaller power consumption than in prior art communication systems. The invention is especially suited for use locally in control applications, local area networks, toys, etc. The invention is based on the idea that the devices of the communication system are divided into different categories (classes), which have different properties. A communication system according to the present invention is characterized in by the which is set forth in the characterizing part of claim 1. A communication device according to the present invention is characterized in by the which is set forth in the characterizing part of claim 11. A method according to the present invention is characterized in by the which is set forth in the characterizing part of claim 12.

The present invention provides considerable advantages compared with prior art communication systems. The different device categories makes it possible to apply the invention also in quite simple and small devices, which normally isn't possible or feasible with prior art systems. Some of the device categories according to the present invention are meant for devices performing quite simple tasks, such as locks, sensors or toys. The communication protocol is constructed so that the devices of the communication system can have low power consumption. One reason for that is that the duty cycle of the communication protocol is quite small, wherein power demanding tasks, such as transmission, are short.

DESCRIPTION OF THE DRAWINGS

In the following, the present invention will be described in more detail with reference to the accompanying drawings, in which FIGS. 3a to 3g show advantageous frame structures which can be applied with an advantageous communication system according to the invention, FIG. 4 characterize the operation of the MAC layer of an advantageous communication system according to the invention as a state machine, FIGS. 5a and 5b show two alternative situations in which a device enters a connection timeout state.

DETAILED DESCRIPTION OF THE INVENTION

Figure 9:
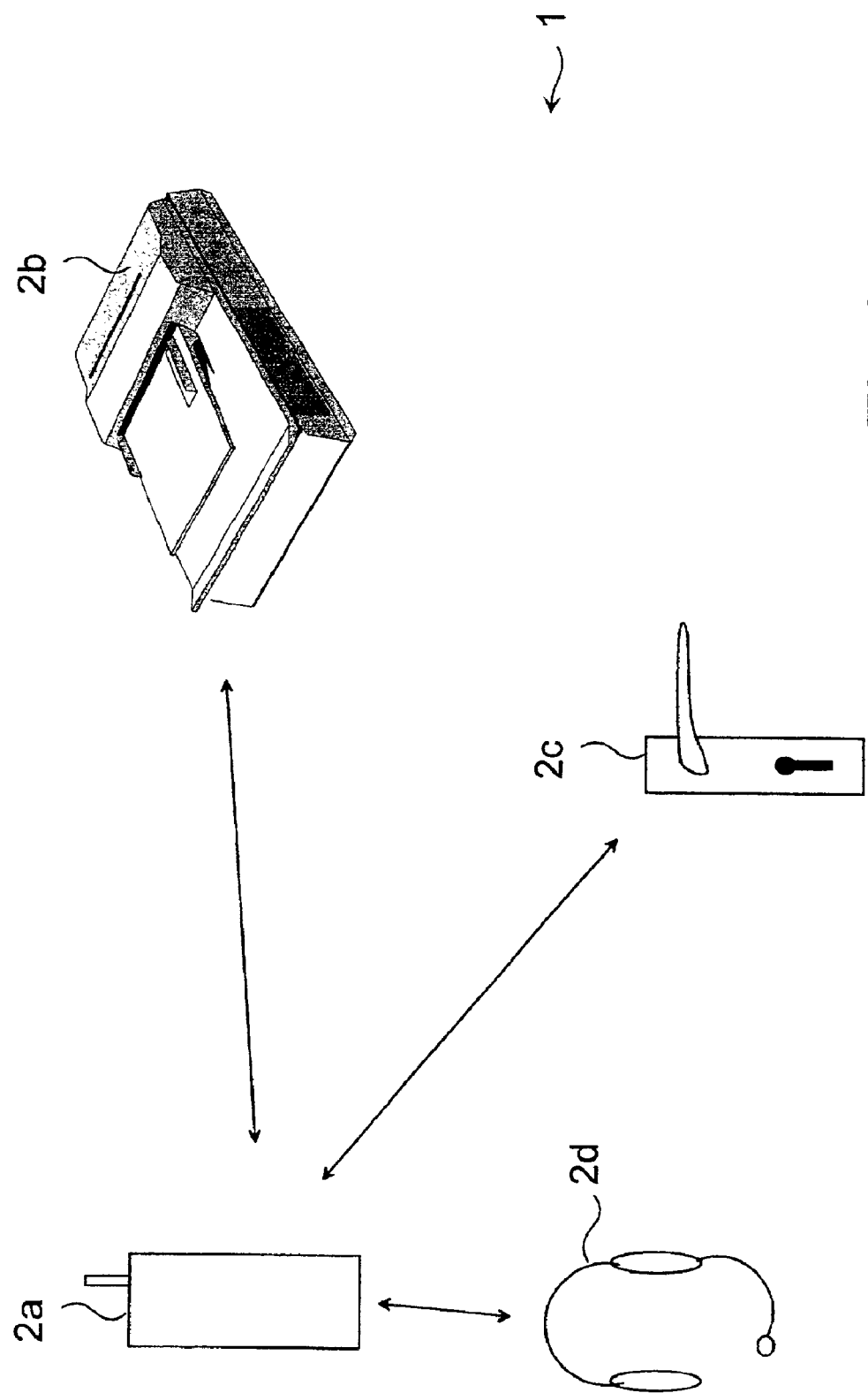
FIG. 9 shows an example of the communication system according to the present invention.

In the following, the operation of a communication system 1 according to an advantageous embodiment of the invention will be described with reference to FIG. 9. In FIG. 9 there are shown some examples of devices 2a–2d which can be used in the communication system 1 of the present invention. The devices 2a–2d comprise communication means for exchanging information with other devices. It is obvious that the devices shown are just not restrictive examples but in practical implementations the number and nature of the devices can vary.

In an advantageous communication system of the invention the devices can be categorized into different classes, for example into three ones: a first class device, a second class device, and a third class device. The first class device can use all the channels of the communication system for communication. Therefore the first class device can communicate with all other devices independent of their class. The second class device can only communicate in one or a few channels, wherein the second class device can communicate with other second class devices and with first class devices. Also the third class device can only communicate in one or few channels, but different from the channels used by the second class devices, wherein the third class device can preferably communicate with other third class devices and with first class devices. In the description below, the first class device is called as a mini device, the second class device is called as a pico device, and the third class device is called as a beacon device.

The operation of the devices can be described by a protocol stack (not shown), which is known as such. The protocol stack has at least a physical layer (PHY), a media access control layer (MAC) and an application layer. There may also be other layers in different implementations but this description mainly describes the properties of the physical layer and the media access layer.

Physical (PHY) Layer

The communication system 1 operates preferably in a license free, or unlicensed frequency band, i.e. any licences for establishing a communication system are not needed. Such frequency bands may differ in different areas of the world, but there are some frequency bands which are globally available for unlicensed communication in the time of filing this application. For example, 2.45 GHz frequency area can be used. Therefore, the default frequency band for the communication system 1 is the global unlicensed ISM band at 2400–2483.5 MHz. However, the system can utilize with minor modifications any suitable frequency band that is wide enough. For example, regional ISM bands at 902–928 MHz in U.S. and 433.050–434.790 MHz in Europe can be used and actually they can be more favourable than the 2.45 GHz band in some applications.

Figure 1:
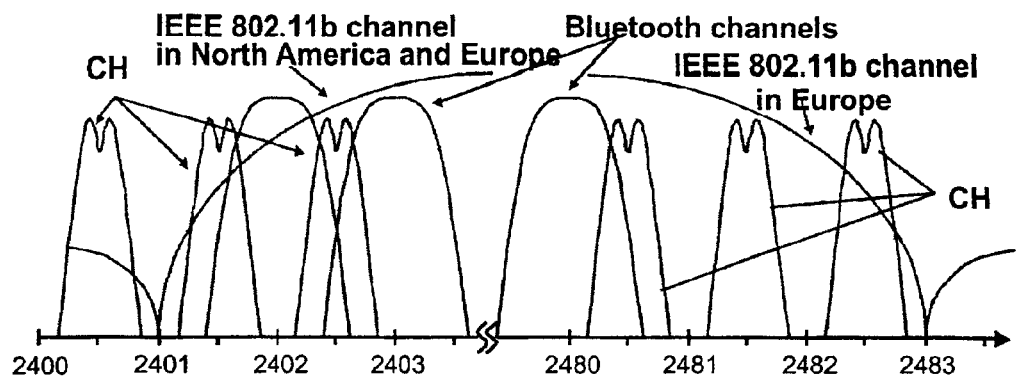
FIG. 1 shows an example of the communication channel arrangement of an advantageous communication system according to the invention.

The selected operation frequency band is divided into communication channels. The number of channels may vary in different applications. The number of channels depends on the operation frequency bands, but in case of the 2.45 GHz ISM band and 1 MHz channel separation it is possible to use 83 channels with center frequencies at 2400.5+k×1 MHz, where k=0 . . . 82. The FIG. 1 shows an example of such a channel arrangement. The channels (some of them are marked with literals CH in FIG. 1) are located between Bluetooth channels to suppress interference but it is also possible that the channels overlap substantially exactly with Bluetooth channels to enable a Bluetooth device to act as a member of the described system with minor modifications. Moreover, a few channels at the edges of the band are less or very little susceptible to Bluetooth and IEEE 802.11b WLAN interference as shown in FIG. 1. It is possible to use the channels at the edges of the frequency band, because the transmission power of the devices of different classes are quite small wherein the interference power leaking outside the system band is in acceptable limits. With systems according to e.g. RFID, Bluetooth and WLAN, it is not possible to use the channels at the edges of the frequency bands, or at least the transmission power must be reduced more than the transmission power within other channels. Therefore, Bluetooth and WLAN systems don't normally use the channels at the edges.

The symbol rate of the communication system 1 is 200 ksymbols/s or less so the system is especially suitable for applications in which high speed data transfer is not necessary. The utilized modulation scheme is 2GFSK. The modulation index is advantageously h=2 . . . 3, preferably h=2.5. The applied pulse shaping is Gaussian with BT preferably 0.5.

Figure 2:
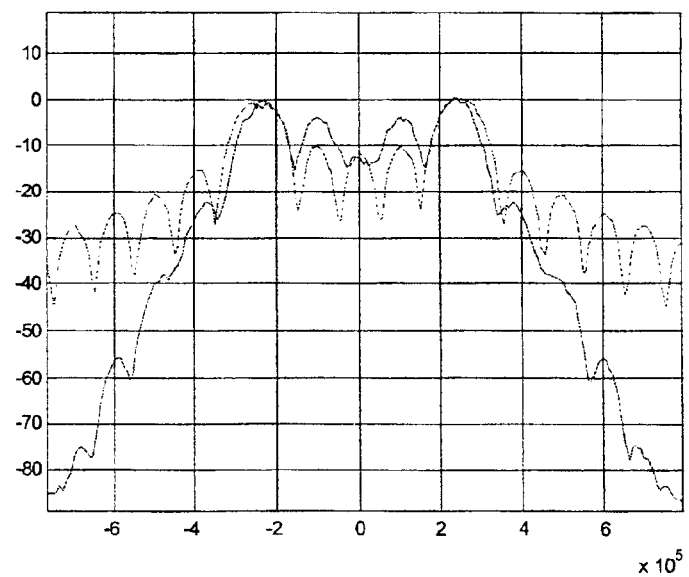
FIG. 2 shows spectrum of transmitted signal in an advantageous communication system according to the invention.

The used modulation scheme generates a spectrum with power maxima quite far away from each other and a local minimum at the center frequency of the carrier as shown in FIG. 2. This signifies that the disadvantageous DC offset in a direct conversion receiver can be filtered away without negatively affecting the link performance of the system, and implementation of a minimum complexity receiver is thus enabled.

The used modulation scheme also makes it possible to use quite simple transmitters and receivers in the devices 2a–2d of the communication system 1 of the present invention. For example, the transmitter can utilize an open-loop architecture, and the receiver can be a direct conversion receiver. Further, in the communication system according to the preferred embodiment of the invention pico and beacon devices may use simplified RF frequency generation means compared to mini devices operating in all channels.

Because of the requirements of the physical layer, a MAC layer packet structure is preceded by a preamble shown in FIG. 3a. The receiver performs frequency synchronization and symbol timing estimation during the receiving of the preamble. The length of the preamble is preferably 16 . . . 40 bits.

Channel coding is not necessarily used because the channel coding may not decrease the effects of interference when the transmission is overlapped by a high power interference. The use of channel coding would also increase the complexity of the device. The reliability of the communication can be increased on higher levels of the protocol stack by using e.g. retransmissions. One quite easily implementable alternative to increase the reliability of the communication is to use repetition coding on one or more protocol levels.

Device classes

The device classes from the physical layer point of view are shown in Table 1. It is obvious that the Table 1 is not restrictive example of the properties of different devices but in practical implementations different kind of properties and different device classes are possible. A mini device can operate at all the available channels, whereas pico and beacon devices are capable of operating at only one, or just few, predetermined channel(s). Furthermore, the output power of a beacon device is preferably lower than that of the other classes.

TABLE 1

| Device Class | Operating channels | TX power [dBm] | Range [m] |
|---|---|---|---|
| Mini | All channels | −20 . . . −10 | 3 . . . 10 |
| Pico | One or a few channels | −20 . . . −10 | 3 . . . 10 |
| Beacon | One or a few channels | −30 . . . −20 | 1 . . . 3 |

Media Access Control (MAC) Layer

In the following, the structure of the MAC layer according to an advantageous embodiment of the invention will be described. Similar device classes are also defined for the MAC layer than for the physical layer: Mini, Pico and Beacon. Mini is able to operate in any of the 83 frequency channels, whereas all Pico and Beacon devices operate in a single frequency channel only. However, Pico and Beacon devices operate in different frequencies. The differences between the devices are summarized in Table 2.

TABLE 2

| Device Class | Operating band | TxP [dBm] | Range [m] | Delay | L2 Bit rate [kbps] |
|---|---|---|---|---|---|
| Mini | 82 MHz [ISM] | 20 ... −10 | 3 ... 10 | Allowed | "High"(e.g. ~50 kbps) |
| Pico | 1 or few channels [B1 at ISM] | 20 ... −10 | 3 ... 10 | Allowed | "Low" |
| Beacon | 1 or few channels [B2 at ISM] | −30 ... −20 | 1 | Low | "Low" |

The mini devices use also their nominal transmission power TxP of 20 . . . −10 dBm in the Beacon channel. Therefore the simplest and cheapest devices are suitable target applications for the beacon device. An example of a target application for a Beacon class device is a lock. An example of a target application for a Pico class device is a printer. An example of a target application for a Mini class device is a wireless terminal.

As mentioned above, the ISM band is divided into 83 frequency channels. According to the preferred embodiment of the invention the frequencies are pre-assigned for different device classes as follows: 1 Pico channel, 1 Beacon channel, 5 Service Advertisement Channels (SAC0–SAC4) and 76 Unicast channels.

TABLE 3

Pico Channel
Service Advertisement Channel 1
Service Advertisement Channel 2
Service Advertisement Channel 3
Service Advertisement Channel 4
Unicast Channel 1
Unicast Channel 2
Unicast Channel 3
Unicast Channel 4
Unicast Channel 5
Unicast Channel 6
Unicast Channel 7
Unicast Channel 8
Unicast Channel 9
Unicast Channel 10
Unicast Channel 11
Unicast Channel 12
Unicast Channel 13
Unicast Channel 14
Unicast Channel 15
.
.
.
Unicast Channel 65
Unicast Channel 66
Unicast Channel 67
Unicast Channel 68
Unicast Channel 69
Unicast Channel 70
Unicast Channel 71
Unicast Channel 72
Unicast Channel 73
Unicast Channel 74
Unicast Channel 75
Unicast Channel 76
Service Advertisement Channel 0
Beacon Channel The number of different kind of channels and the placement of the different channels into the frequency band is not limited to the embodiment presented above. For example, the number of Service Advertisement Channels can be greater or smaller than 5.

The usage of the Service Advertisement, Pico and Beacon Channels is limited. The Service Advertisement Channels are preferably meant for mini devices to inform (advertising) their existence and properties to other mini devices and to request properties of other mini device(s). The Service Advertisement Channels use preferably at least one communication channel near the edges of the operating frequency band. For example, according to the channel arrangement of Table 3 the Service Advertisement Channel 0 is situated near one end of the operating frequency band (adjacent to the Beacon Channel) and other Service Advertisement Channels 1–4 are situated near the other end of the operating frequency band (adjacent to the Pico Channel). This arrangement has the advantage that in a situation in which e.g. SAC0 is disturbed, the probability that the source of the disturbance also disturbs the other SACs is smaller compared with an arrangement in which all the SACs are adjacent to each other.

The Pico Channel should only be used in communication between Pico devices or a Pico device and another device. Respectively, the Beacon Channel should only be used in communication between Beacon devices or a Beacon device and another device. A mini device should use other channels (the 76 Unicast channels) in communication with another mini device.

There are also other limitations in the Service Advertisement, Pico and Beacon Channels. The duty cycle is limited by timers and maximum packet size in the Service Advertisement and Pico channels. In beacon channel the transmission of the Beacon devices is not restricted, however, the transmission power of the beacon devices is restricted. The communication procedure is described later in this description.

Every air interface transmission, excluding Identification Information PDU (Packet Data Unit) in the Beacon channel, is preceded by carrier sensing and collision avoidance protocol (CSMA/CA). The device which is going to transmit, will first listen the channel to determine if there already is ongoing transmission. In such a case the device will wait and try the transmission a little bit later. The used parameters, e.g. maximum time for waiting the transmission and time between the trials of transmission, may vary in the different channels.

In the unicast frequencies CSMA scheme may be replaced by an optional polling scheme in order to meet the bit rate with a latency requirements.

Operational states

Figure 4:
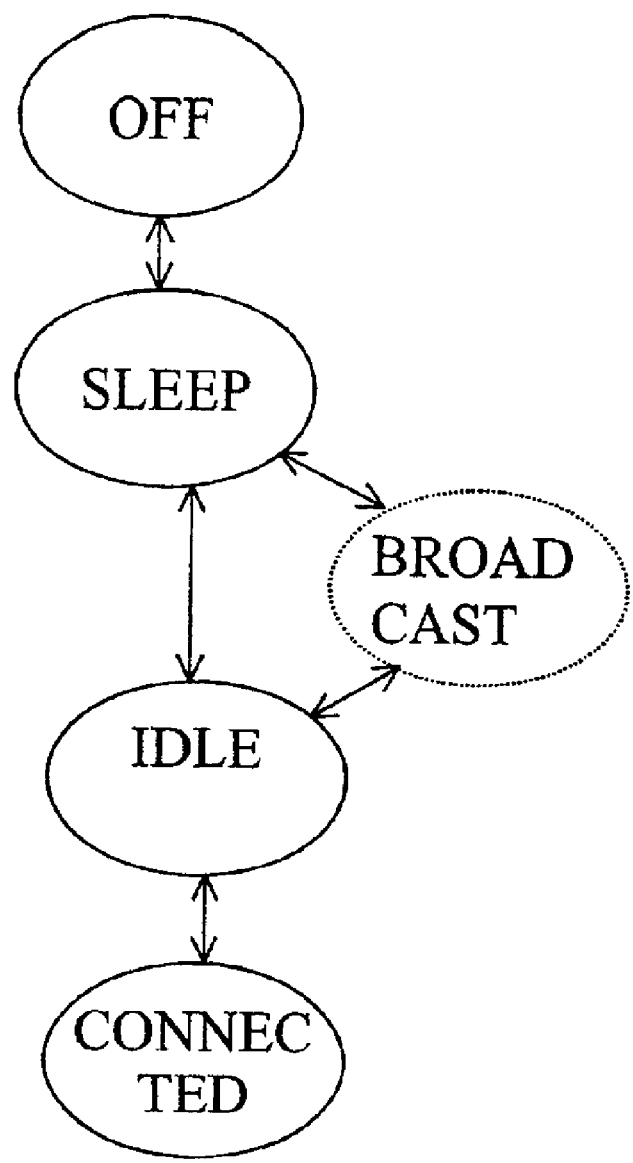

The devices of the communication system according to the invention have following operational states which characterize the operation of the MAC layer: OFF, SLEEP, BROADCAST, IDLE and CONNECTED (in mini devices only). FIG. 4 describes the different states and possible transmissions between the states as a state machine. The OFF state is power off state. In the SLEEP state, the state can be changed by a timer or by upper layer. During the BROADCAST state the device broadcasts the Identification Information PDU and is available to receive a PDU. In the IDLE state the device is exchanging data or scanning the Identification Information PDUs. A Mini device is in the CONNECT state if it has agreed a unicast connection with another device by using CONNECTION_REQUEST and CONNECTION_RES PDUs.

Device Discovery Scheme

To combine low power consumption and efficient paging times the Service Advertisement Channels are used by Mini class devices to periodically advertise their services and/or presence. The device willing to establish data connection just listens these advertising PDUs and responds to the desired advertising.

Service Advertisement Channel 0

SAC (Service Advertisement Channel) number 0 is the default channel which is shared by the Mini devices. Every device shall send its own Identification Information PDU to this channel periodically. The device may independently decide the frequency it advertises itself between the minimum and maximum times. This information preferably consist of lower part (40 LSB bits) of IEEE address and channel number which this particular device will listen after transmitting the identification information to the Service Advertisement Channel. The device may broadcast the Identification Information PDU with the S/I field indicating Send (S). An example of the packet structure used in the transmission of the identification information is shown in FIG. 3b. For example, in the SAC 0 channel the device shall not advertise itself more frequently than once a second and the device shall advertise itself at least once in 10 seconds.

The Identification Information PDU id_info (FIGS. 6–8) indicates that the device with the given address can be contacted in the given unicast channel for a certain time which is defined by a parameter n_SAC (TBS) (in milliseconds). The device may also inform the value of the listening time in the Identification Information PDU.

Service Advertisement Channels 1–4

Service Advertisement Channels 1–4 are used in case channel 0 is too congested. The device changes to transmit from Service Advertisement Channel 0 to some other Service Advertisement Channel 1, 2, 3 or 4 after e.g. three unsuccessful attempts to send to channel number 0. New Service Advertisement Channels is selected based e.g. on device's IEEE address. The IEEE addresses are preferably allocated so that a part of the address reveals the device type. This device type part is used when selecting the SAC. In the preferred embodiment of the present invention the Service Advertisement Channels 1 to 4 are reserved only for temporal use wherein the device must return to Service Advertisement Channel 0 after a specified time.

CSMA timer for SAC operation

Carrier sense multiple access (CSMA) is used as a method to access Service Advertisement Channels. If first attempt to send Identification Information PDU to SAC0 is cancelled because of ongoing transmission, a retransmission timer is initialized with a random number within specified range. When this retransmission timer expires, second attempt to send Identification Information PDU should take place. If sending is again cancelled, retransmission timer is initialized, but this time using a random time within a specified range which is multiplied by a certain factor, preferably by two. The second expiration of retransmission timer indicates that three consecutive transmissions have been carried out and device should change the transmission to another Service Advertisement Channel.

Figure 6:
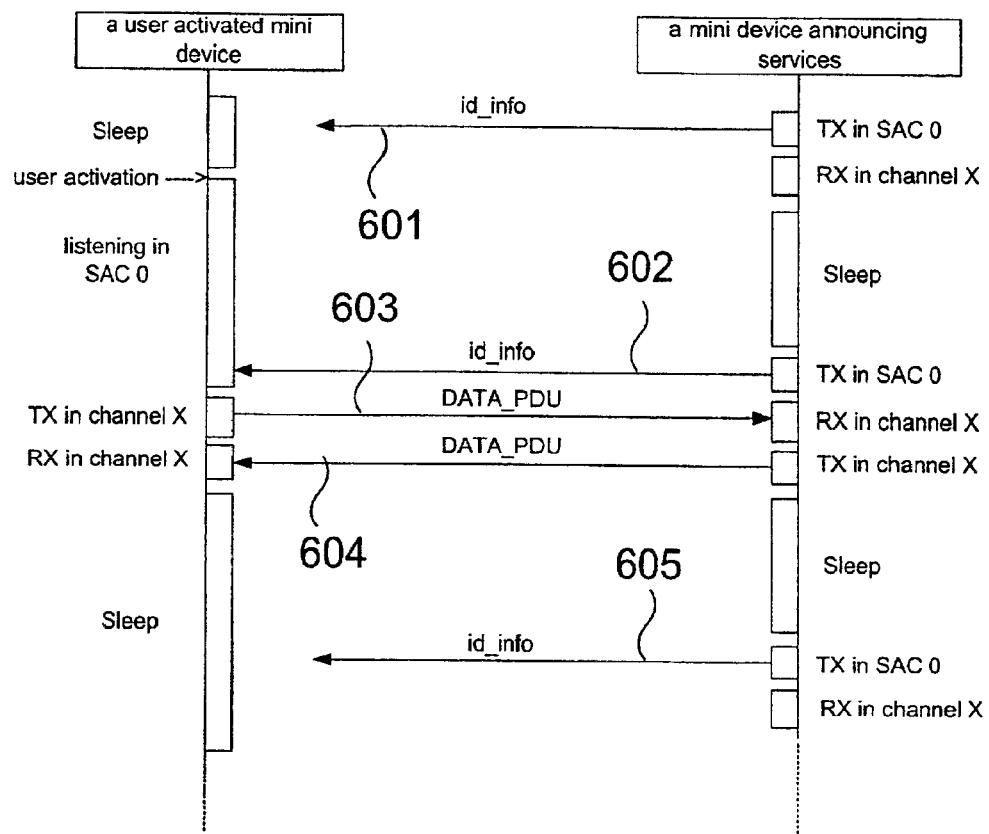
FIG. 6 shows communication between two devices which are categorized into a first class as a signal diagram.

FIG. 6 shows as a signal diagram an example situation of communication between two devices which are categorized into a first class. On the left the operation of a first mini device is shown, and on the right the operation of a second mini device is shown. The first mini device is e.g. a wireless terminal 2a (FIG. 9) and the second mini device is e.g. wireless headphones 2d. The second mini device is periodically transmitting Identification Information PDU id_info on SAC0 to inform its presence to other mini devices (arrow 601 in FIG. 6). In the Identification Information PDU the second mini device preferably informs the unicast channel number in which a device receiving this message should send a response message. The second mini device 2d begins to receive that channel (channel X) for a certain time. However, the second mini device 2a is in the SLEEP mode so it is not listening transmissions on the SAC0. The second mini device does not receive any PDUs on channel X during the listening time so it will enter the SLEEP mode for a certain time (e.g. for 1 second). After the time has expired, the second terminal transmits on SAC0 again (arrow 602). The user of the first mini device has now activated the mini device to listen the SAC0. The first mini device now receives the transmitted PDU id_info from the second mini device. The first mini device responses to the second mini device by sending a PDU on the channel X (arrow 603). The PDU transmitted from the first mini device may contain information of the properties of the first mini device, and/or some other information. The PDU may also contain a request to the second mini device for sending certain information to the first mini device. The second mini device receives the PDU from the first device and examines the contents of the PDU. After that, the second mini device 2b sends a PDU (arrow 604) to the first device 2a and enters the SLEEP mode for the certain time. Again, after the time has expired, the second mini device transmits on SAC0 (arrow 605) and if there are mini devices which are listening, the procedure presented above is repeated. Otherwise the second terminal switches between the transmission, listening, and SLEEP.

Figure 8:
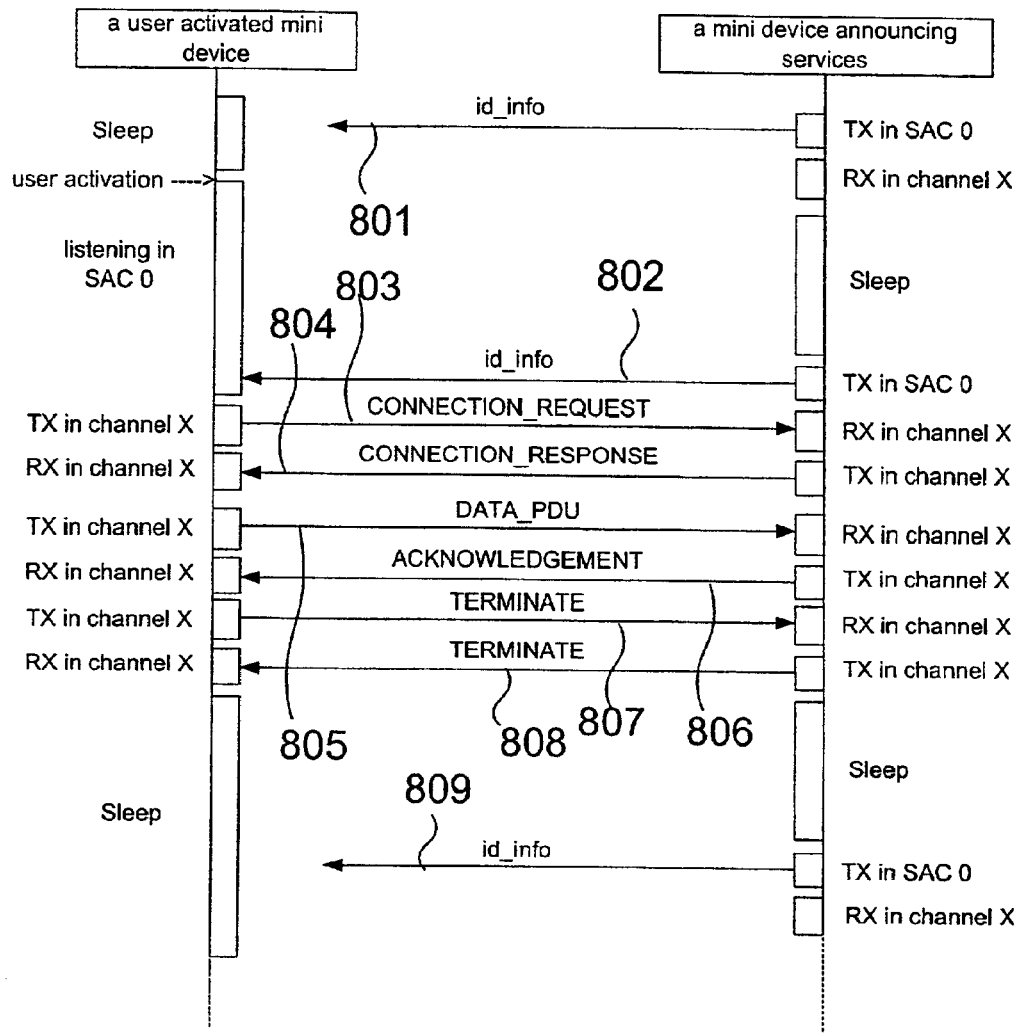
FIG. 8 shows a connection establishment procedure between two devices which are categorized into a first class as a signal diagram.

FIG. 8 shows as a signal diagram an example situation of a connection establishment procedure between two devices which are categorized into a first class. On the left the operation of a first mini device is shown, and on the right the operation of a second mini device is shown. The first mini device is e.g. a wireless terminal 2a and the second mini device is e.g. wireless headphones 2d. The second mini device is periodically transmitting on SAC0 to inform its presence to other mini devices (arrow 801 in FIG. 8) and begins to receive in data channel X for a certain time. However, the second mini device 2a is in the SLEEP mode so it is not listening transmissions on the SAC0. The second mini device does not receive any PDUs on SAC0 during the listening time so it will enter the SLEEP mode for a certain time. After the time has expired, the second terminal transmits on SAC0 again (arrow 802). For example, there is a call coming and the user of the first mini device wants to answer the call. The first mini device is therefore activated to listen the SAC0 and it receives the transmitted PDU id_info from the second mini device. The first mini device responses to the second mini device by sending a connection request PDU on the channel X (arrow 803). The first mini device may select the channel e.g. from a stored list, by examining which unicast channel is free, or randomly. The second mini device receives the PDU from the first device and examines the contents of the PDU. After that, the second mini device 2b sends a connection response PDU (arrow 804) to the first device 2a and enters the CONNECTED mode (FIG. 4). The first mini device receives the response (arrow 804) and also enters the CONNECTED mode. Now the first and the second mini device can communicate by sending PDUs (arrow 805) which will be acknowledged by the receiving device, if the PDU is received correctly (arrow 806). The transmitted PDUs may contain e.g. data to transmit audio signals between the wireless headphones and the wireless terminal, or packets from higher layers of the protocol stack (e.g. from application layer). When the connection is to be detached, both terminals send a terminate PDU (arrows 807 and 808) and advantageously enter the SLEEP mode.

The transmission may not be error free. For example, other devices may disturb the communication of the devices of the communication according to the present invention. In such a situation the mini devices may change the unicast channel to another unicast channel, or SAC to another SAC. The selection of the new channel may be based e.g. on a certain order, or it may depend on statistical information of previous connections, or it may be random. It is also possible that the connection is utilizing frequency hopping, wherein the channel is automatically changed during the connection. The disturbances in the Pico channel(s) and Beacon channel (s) are not so probable because those channels are situated at the edges of the frequency area of the communication system.

Pico channel

The connection discovery scheme in the Pico channel is similar to the Service Advertisement Channels with the following exceptions:

1. The unicast frequency information field in the Identification Information PDU contains value 0 in the example data frame in FIG. 3*b*. i.e. the Identification Information PDU indicates that the device with the given address could be contacted only in the Pico channel for a certain time, which can be defined by a parameter next n_PICO (TBS) (in milliseconds).
2. The highest allowed advertising duty cycle is lower than in SAC channels. E.g. once in 2 seconds.
3. In case of a congestion, the Pico Device shall lower its advertising frequency. For example, if the transmission of the Pico device is denied three times (CSMA is applied as in the SAC channels) the minimum allowed advertising frequency for that device is e.g. 4 seconds instead for the default 2 seconds. The lower duty-cycle limit is valid for the specified time.

Beacon channel

In the preferred embodiment of the invention the paging scheme in the Beacon channel differs from the SAC and Pico channels in order to have low latency responses. In the Beacon channel, the beacon devices may send Identification Information PDU without the preceding carrier sensing and without any duty cycle. In an advantageous embodiment of the invention Beacon devices send Identification Information PDUs more frequently than other devices. The transmission power of Beacon devices is advantageously smaller than the transmission power of other devices.

Figure 7:
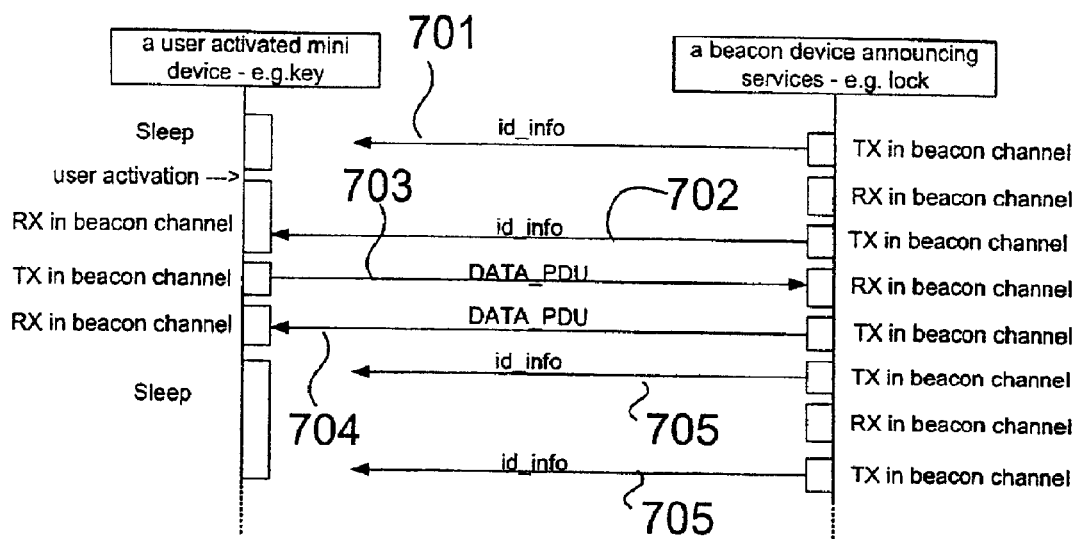
FIG. 7 shows communication between a first class device and a third class device as a signal diagram.

FIG. 7 shows an example of communication between a first class device and a third class device as a signal diagram. On the left the operation of a mini device is shown, and on the right the operation of a beacon device is shown. The beacon device is e.g. a lock 2*c* (FIG. 9) and the mini device is e.g. a wireless terminal 2*a* which is now used to control the lock. The beacon device is periodically transmitting on Beacon Channel to inform its presence to other devices (arrow 701 in FIG. 7) and begins to receive that channel for a certain time. However, the mini device 2*a* is in the SLEEP mode so it is not listening transmissions on the Beacon Channel. The beacon device does not receive any PDUs on Beacon Channel during the listening time so it will continue transmitting on Beacon Channel (arrow 702). The user of the mini device has now activated it for example to open the lock, therein the mini device is listening the Beacon Channel and receives the transmitted PDU id_info from the beacon device. The mini device responses to the beacon device by sending a PDU on the Beacon Channel (arrow 703). The PDU transmitted from the mini device may contain e.g. authentication information of the mini device. The beacon terminal receives the PDU from the mini device and examines the contents of the PDU. If the PDU contains a request to open the lock and identification information, the beacon device checks the validity of the identity and opens the lock if the identity is correct. The beacon terminal 2*b* sends a PDU (arrow 704) to the mini device 2*a*. The mini device may now enter the SLEEP mode (and normal duty cycle). The beacon device will continue the transmission on Beacon Channel (arrow 705) and listening Beacon Channel.

The response time can also be lowered so that an upper layer packet (max size X bits) can be included in the Identification Information PDU in the beacon channel.

An example of the packet structure used in the beacon channel is shown in FIG. 3*c*.

In the Unicast and Beacon channels, after receiving the service advertisement from the desired unit the initiating device may either send a CONNECTION_REQUEST PDU (as was described above with description of FIG. 8) or it may directly send a DATA PDU (as was described above with description of FIG. 6). If the DATA PDU is directly sent the receiving device will response with a single DATA PDU after which the connection terminates immediately. If a larger amount of data will be sent the paging unit shall first send the CONNECTION_REQUEST PDU which is replied by the contacted unit by a CONNECTION_RESPONSE PDU.

In the Pico channel the initiating device directly sends a DATA PDU.

The contacted unit may response by a single DATA PDU after which the connection terminates automatically.

Device Inquiry

The Service advertising scheme contains the feature for inquiry as well. A device inquiring other devices/services listens SAC, Pico and/or Beacon channels and collects the relevant information.

The Additional Special Device Scheme

In the neighborhood there may be an Inquiry response device, which collects information of the other devices and the services they offer. It has not a constrained power usage (e.g. wireline power supply). The inquiring device may broadcast the Identification Information PDU with the S/I field indicating Inquiry (I) at the SAC or Pico channel. An Inquiry response device may page the inquiring device to supply the device and service information to the inquiring device.

Data transfer in Unicast Channels

All data traffic between two mini devices takes place in the Unicast Channels. These channels are used as long as two devices have something to send to each other or some timeout timer expires and indicates that device should return to SA channel.

Entering into Unicast Channel

Device selects randomly or by carrier sensing an unicast channel, which it will listen for a time duration after sending Identification Information PDU to Service Advertisement Channel. The selected unicast channel number is indicated in Identification Information PDU. When device is tuned to this new frequency, it shall start connectionTO timer.

It is possible that two or more devices are willing to establish data connection with the same device at the same time and this results to the situation where three or more devices are in the unicast channel. In this case device which advertised its services in Service Advertisement Channel will accept data packets only from the device where from it first successfully received data packet. Other devices' connectionTO timer will expire and they will return to SA channel.

Unicast channel operation

A CSMA channel access scheme is used. Authentication and security matters are preferably handled by upper layers of the protocol stack.

Stop-and-wait acknowledge (ARQ) is preferably applied in the unicast channel operation. The device shall wait for acknowledge message after every data packet that is sent. Acknowledgement indication is included in packet header. If acknowledgement is not received within a certain time (AcknowledgementTO), re-transmission is carried out when the timer expires.

The maximum payload size is in Unicast Channel in an advantageous embodiment of the invention is 1.6 kBytes.

Timers

In the following, some timing functions of the communication system according to an advantageous embodiment of the invention are described. A connectionTO timer is defined for limiting the time a device may wait for packets from a unicast channel. When entered to unicast channel, if this timer expires before any data packet is received, the device returns to Service Advertisement Channel. If data packet is received, device sends acknowledge message (with data if needed) and resets connectionTO timer. In general, this timer is reset, e.g. set to zero, every time when some packet is correctly received. FIG. 5a shows a situation in which the connectionTO timer is reset when a packet is received but no other packets are received before the connectionTO timer expires.

AcknowledgeTO timer is used to control retransmissions in unicast channels. This timer is initialized every time when device sends data packet and it expects for acknowledge message from destination device. In case acknowledgeTO timer expires before device receives acknowledge message, retransmission of the packet is carried out. If this timer expires three times consecutively, the device will return to SA channel. On the other hand, if acknowledgement is received correctly, acknowledgeTO timer is ignored.

Timers are preferably specified so that that connectionTO time is more than three times longer than acknowledgeTO time. This means that device tries to retransmit data packet one or more times before connectionTO expires and device returns to SA channel as is shown in FIG. 5b.

Leaving Unicast Channel

When device does not have anything to send anymore and it is not expecting any data from other party (for example, higher layer packet is uncompleted), it can send TERMINATE PDU to other device. When device receives this message it can either accept it by sending TERMINATE message or reject it by sending new data.

Data Transfer in Pico and BEACON Channels

The data transfer in the Beacon channel follows the principles presented above in connection with SAC and Unicast channels.

In the Pico channel it is only possible to exchange a pair of DATA PDUs. The connection establishment using the CONNECTION_REQUEST and CONNECTION_RESPONSE is not possible to avoid blocking of Pico channel.

Packet data UNITs (PDU)

In addition to already defined Identification Information PDU the following PDUs according to the preferred embodiment of the present invention are described in more detail in this description: CONNECTION_REQUEST, CONNECTION_RESPONSE, DATA, ACKNOWLEDGE and TERMINATE. The link layer acknowledgement PDU is a header only PDU.

General Packet Structure

The general format of the PDUs, excluding the Identification Information PDU, is shown in FIG. 3d. The fields of the packet are described in more details in Table 4. CONNECTION_REQUEST and CONNECTION_RESPONSE packets are distinguished from data packets based on TYPE/SAR field and value 00 is used for these packets. These packets carry control data as a payload and this control data may include for example parameters for the data connection, such as connectionTO value, acknowledgeTO value, etc. DATA packet consist of the header and variable size payload field. ACKNOWLEDGE packet carry only header and CRC without any payload. TERMINATE packet is used to release unicast connection and it is indicated with TYPE/SAR field value of 00. Connection terminate message from higher layer is included in payload field.

TABLE 4

| Field name | Length | Purpose |
| --- | --- | --- |
| Source address | 40 bits | Source address is the lower part of source device's 64-bit IEEE device address. |
| Destination address | 40 bits | Destination address is the lower part of destination device's 64-bit IEEE device address. |
| TYPE/SAR | 2 bits | This field is combined TYPE and SAR information value for the payload:<br>00 = payload is MAC layer control packet<br>01 = payload is the beginning of the higher layer data packet<br>10 = payload is middle or end of higher layer data packet<br>11 = future use |
| ACK bit | 1 bit | Acknowledge bit to indicate whether last data packet was received correctly or not:<br>0 = packet was not received correctly<br>1 = packet was received with correct CRC value |
| Data Length | 10 bits | This field indicates the length of payload in bytes. |
| Payload | Mini: 0–1.6 kbytes<br>Pico: 0–1.6 kbytes<br>Beacon: 0–1.6 kbytes | Payload consists of higher layer data. |
| CRC | xx bits | CRC value is used to detect bit errors, which has occurred during transmission. |

The type of message bits equals 00 in CONNECTION_REQUEST PDU and it has the following parameters: connectionTO value, acknowledgeTO value, ARQ scheme, and amount of the baseband data packets.

The Mini devices may send the CONNECTION_REQUEST PDU in Unicast channel as a first packet when channel is entered. This packet is encapsulated to the baseband packet's payload field.

The CONNECTION_REQUEST PDU is used for establishing data connection for longer time and to allow devices to exchange several data packets. If this packet is not sent in the beginning of transaction in Unicast channel, devices shall return to SA Channel after one successfully sent data packet.

Packet consist of parameters for timeout timers and ARQ scheme and the amount of the baseband packets that contacting device is going to send to the destination. FIG. 3e and Table 5 describe the CONNECTION_REQUEST PDU.

TABLE 5

| Field name | Length | Purpose |
| --- | --- | --- |
| Type of message | 2 bits | Indicates type of the MAC layer control message:<br>00 = CONNECTION_REQUEST<br>01 = CONNECTION_RESPONSE<br>10 = TERMINATE |
| ConnectionTO value | 16 bits | Contacting device proposes this value to be used for the ConnectionTO timer. |
| AcknowledgeTO value | 16 bits | Contacting device proposes this value to be used for the AcknowledgeTO timer. |
| ARQ scheme | 2 bits | Proposal for the ARQ scheme for the data connection<br>00 = Normal ARQ, ACK message after every baseband packet<br>01 = No ARQ applied, no ACK messages used<br>10 = future use<br>11 = future use |
| Radio access scheme | 1 bit | CSMA/Polling (Polling is optional feature) |
| Amount of packets? | 16 bits | Amount of the baseband packets that contacting device is going to send. |

After sending this packet, device is expecting for CONNECTION_RESPONSE packet. This packet includes agreed values for the parameters. If there is a conflict between proposed and agreed parameter values, then values from the CONNECTION_RESPONSE packet will override the proposed values.

The type of message bits equals 01 in CONNECTION_RESPONSE PDU (FIG. 3f) and it has the following parameters: connectionTO value, acknowledgeTO value, ARQ scheme, amount of the baseband data packets.

The Mini devices may transmit the CONNECTION_RESPONSE PDU in the Unicast channel. This packet is encapsulated to the baseband packet's payload field.

The CONNECTION_RESPONSE PDU is used for responding the CONNECTION_REQUEST message. It consist of accepted parameters for timeout timers and ARQ scheme and amount of packets that contacted device is going to send to the source device (e.g. device that sent CONNECTION_REQUEST packet).

The type of message bits equals 10 in TERMINATE PDU (FIG. 3g) and it has the following parameter: Reason code (optional). The Mini devices may send the PDU in Unicast channel.

The Mini devices use this PDU to terminate data connection in Unicast channel. Response to this message can either be ACKNOWLEDGE message (positive response, devices shall return to SA Channel) or new data packet (negative response, devices shall remain in Unicast Channel.

Figure 10:
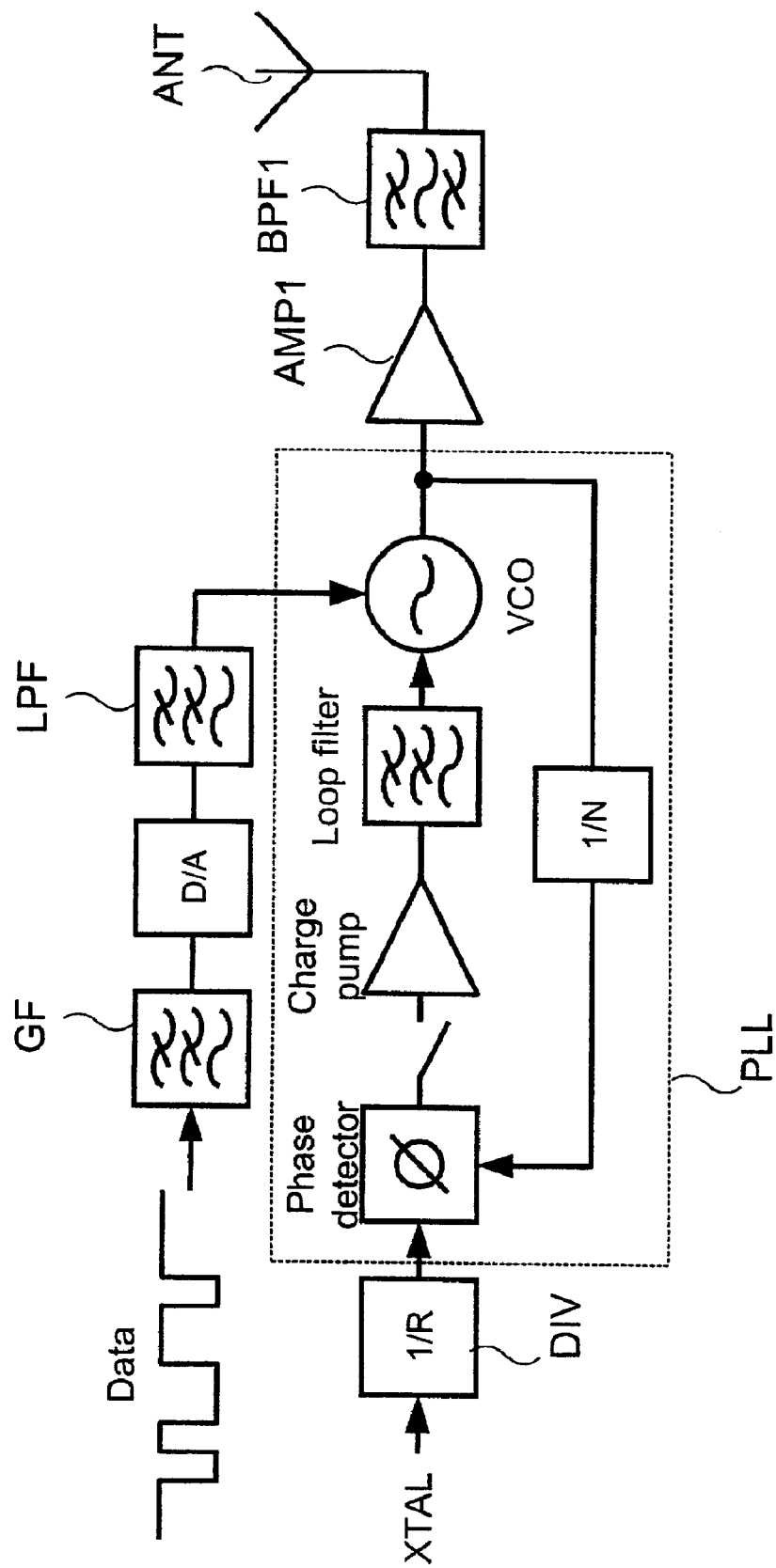
FIG. 10 shows an advantageous embodiment of a transmitter of a device.

FIG. 10 shows an advantageous embodiment of a transmitter TX which can be used in devices 2a–2d of the communication system 1 of the present invention. The first filter GF of the transmitter TX receives the data to be transmitted and filters preferably by Gaussian filtering the received data. The filtered data is converted to analog signal in the digital to analog converter D/A and low pass filtered by the low pass filter LPF. The low pass filtered signal modulates the voltage controlled oscillator VCO, and the PLL loop is open during data transmission. The phase locked loop PLL forms the carrier frequency from a reference frequency, preferably from the crystal oscillator signal XTAL, which is divided by a certain number R to select the correct carrier frequency. The modulated signal from the voltage controlled oscillator VCO of the phase locked loop PLL is amplified in the first amplifier AMP1 and band pass filtered in the first band pass filter BPF1 before transmission by the antenna ANT. The transmitter of the Mini device 2a, 2d further comprises means (not shown) for selecting the carrier frequency. Such means for selecting the carrier frequency are not needed in the transmitter of the Pico device 2b and in the transmitter of the Beacon device 2c if they only transmit and receive in one communication channel.

Figure 11:
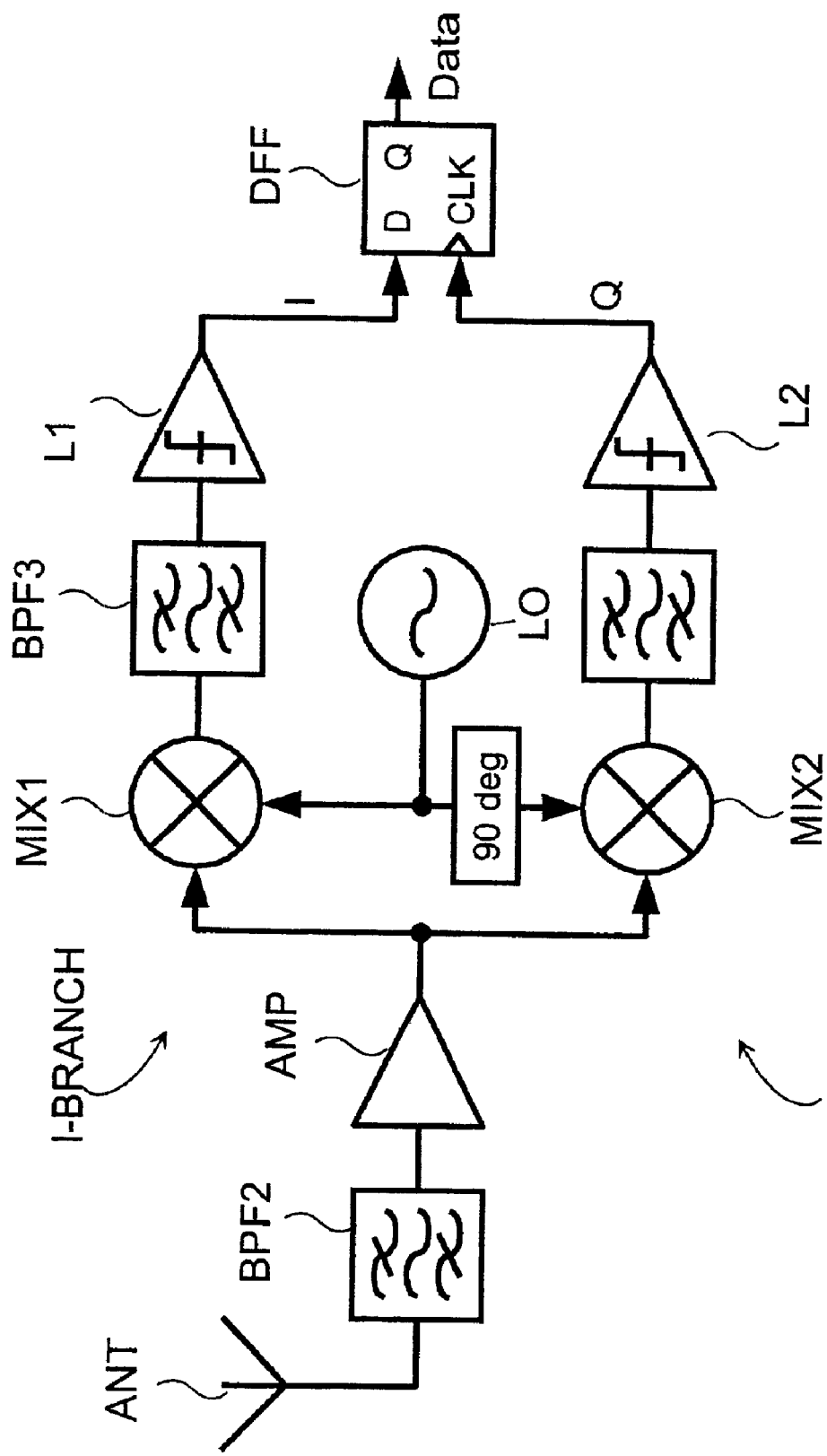
FIG. 11 shows an advantageous embodiment of a receiver of a device.

FIG. 11 shows an advantageous embodiment of a receiver RX which can be used in devices 2a–2d of the communication system 1 of the present invention. The modulated signal received by the antenna ANT is band pass filtered in the second band pass filter BPF2 and amplified in the second amplifier AMP2. Then, the signal is lead to I and Q branches of the receiver to produce quadrature phased I and Q signals by mixing the received signal with the local oscillator signal from the local oscillator LO in mixers MIX1, MIX2. The output signals from the mixers MIX1, MIX2 are band pass filtered in the third BPF3 and fourth band pass filter BPF4 respectively. The filtered signals are limited in the limiters L1, L2. The received data is formed from the I and Q signals by e.g. the D-type flip-flop DFF. The receiver RX of the Mini device 2a, 2d further comprises means (not shown) for selecting the correct local oscillator frequency for enabling the receiver to receive signals from the correct communication channel. Such means for selecting the correct local oscillator frequency are not needed in the receiver RX of the Pico device 2b and in the receiver RX of the Beacon device 2c if they only transmit and receive in one communication channel.

The present invention is not restricted to the above embodiments but it can be modified within the scope of the appended claims.

What is claimed is:

1. A communication system comprising devices having means for short range communication using a certain frequency band, which is divided into communication channels, wherein some of said communication channels are predefined for establishment of the connection and other communication channels are predefined for data transfer between at least two devices, wherein for informing the services of the devices to the communication system the devices comprise means to transmit at intervals in a communication channel for the establishment of the connection, and that each transmission is proceeded by a receiving period during which the device can be connected to the communication system.

2. A communication system according to claim 1, wherein the communication channels are defined and separated according to different central frequencies.

3. A communication system according to claim 1, wherein for the establishment of the connection the system comprises one default communication channel and number of secondary communication channels.

4. A communication system according to claim 1, wherein the devices comprise means to perform a carrier sensing before the transmission.

5. A communication system according to claim 4, wherein the transmission includes a static address of the transmitting device.

6. A communication system according to claim 1, wherein a response is arranged to be formed to the transmission in a communication channel for the establishment of the connection, and that a static address of the responding device and the address of the received transmission are included in the response.

7. A communication system according to claim 1, wherein the transmissions for the establishment of the connection are shifted from the default communication channel to a secondary communication channel, if a congestion is detected in the default channel, and that the transmissions are arranged to be shifted back to the default channel based on a time driven process.

8. A communication system according to claim 1, wherein said certain frequency band is 2.45 GHz ISM band, wherein the symbol rate and the modulation index are selected in such a way that communication channel width is equal or narrower than 1 MHz, and that power maximum of the transmission spectrum of the system is outside the carrier frequency.

9. A communication system according to claim 1, wherein for the channel access a carrier sensing access scheme and a polling access scheme are defined in the system, and that the channel access scheme to be used can be varied between the carrier sensing access scheme and the polling access scheme.

10. A communication device for communication in a communication system, the device having means for short range communication using a certain frequency band, which is divided into communication channels, wherein some of said communication channels are predefined for establishment of the connection and other communication channels are predefined for data transfer between at least two devices, wherein the device comprises means to use a predefined establishment communication channel for establishment of the connection, and a predefined data transfer communication channel for transferring data between said device and another device wherein for informing the services of the devices to the communication system the devices comprise means to transmit at intervals in a communication channel for the establishment of the connection, and that each transmission is proceeded by a receiving period during which the device can be connected to the communication system.

11. A method for performing communication in a communication system comprising devices, which have means for short range communication using a certain frequency band, which is divided into communication channels, wherein some of said communication channels are predefined for establishment of the connection and other communication channels are predefined for data transfer between at least two devices, wherein for informing the services of the devices to the communication system a transmission is performed at intervals in a communication channel for the establishment of the connection, and that each transmission is proceeded by a receiving period during which the device can be connected to the communication system.

12. A method according to claim 11, wherein the communication channels are defined and separated according to different central frequencies.

13. A method according to claim 11, wherein for the establishment of the connection the system comprises one default communication channel and number of secondary communication channels.

14. A method according to claim 11, wherein a carrier sensing is performed before the transmission.

15. A method according to claim 11, wherein a response is formed to the transmission in a communication channel for the establishment of the connection, and that a static address of the responding device and the address of the received transmission are included in the response.

* * * * *